US008626109B2

(12) United States Patent
Ma et al.

(10) Patent No.: US 8,626,109 B2
(45) Date of Patent: Jan. 7, 2014

(54) METHOD FOR CONTROLLING OF RECEIVE DIVERSITY IN AN ANTENNA SYSTEM

(75) Inventors: David Ma, Ottawa (CA); Asif Hossain, San Jose, CA (US); Rakesh Gupta, Ottawa (CA)

(73) Assignee: BlackBerry Limited, Waterloo (CA)

( * ) Notice: Subject to any disclaimer, the term of this patent is extended or adjusted under 35 U.S.C. 154(b) by 138 days.

(21) Appl. No.: 12/858,937

(22) Filed: Aug. 18, 2010

(65) Prior Publication Data

US 2011/0201295 A1 Aug. 18, 2011

Related U.S. Application Data (60) Provisional application No. 61/235,512, filed on Aug. 20, 2009.

(51) Int. Cl.
*H04B 1/16* (2006.01)

(52) U.S. Cl.
USPC ............... 455/343.2; 455/343.5; 455/132; 455/272; 455/566

(58) Field of Classification Search
USPC ........... 455/132–141, 272–280, 343.1–343.6, 455/566
See application file for complete search history.

(56) References Cited

U.S. PATENT DOCUMENTS

| 5,566,364 | A * | 10/1996 | Mizoguchi et al. | 455/132 |
| 6,473,601 | B1 * | 10/2002 | Oda | 455/132 |
| 6,795,038 | B2 * | 9/2004 | Choi | 343/906 |
| 7,366,473 | B2 * | 4/2008 | Lin et al. | 455/63.4 |
| 7,505,795 | B1 * | 3/2009 | Lim et al. | 455/574 |
| 7,555,324 | B2 * | 6/2009 | Uotsu et al. | 455/575.7 |
| 7,734,269 | B2 * | 6/2010 | Komulainen et al. | 455/277.2 |
| 8,023,906 | B2 * | 9/2011 | Okumura | 455/101 |
| 2004/0253955 | A1 * | 12/2004 | Love et al. | 455/442 |
| 2004/0266374 | A1 * | 12/2004 | Saed et al. | 455/134 |

(Continued)

FOREIGN PATENT DOCUMENTS

| GB | 2462997 | 3/2010 |
| JP | 2007036795 | 2/2007 |

(Continued)

OTHER PUBLICATIONS

European Search report dated Apr. 4, 2011; EP Application No. 10173172.7.

(Continued)

*Primary Examiner* — Edward Urban
*Assistant Examiner* — Rui Hu
(74) *Attorney, Agent, or Firm* — Novak Druce Connolly Bove + Quigg LLP (57) ABSTRACT

A method for controlling receive diversity of an antenna system of a computer device, the antenna system including two or more antenna elements. The method includes establishing a session with a remote transmitting system and determining whether a predetermined criteria detected by the computer device is satisfied within the session. If the predetermined criteria is satisfied within the session, the method includes activating at least two of the antenna elements for receiving transmissions, enabling performance of receive diversity on the received transmissions, and performing receive diversity on the received transmissions. If the predetermined criteria is not satisfied within the session, the method includes activating at least one of the antenna elements, disabling performance of receive diversity on the received transmissions, and performing a default signal processing on the received transmissions. A mobile communication device may be used to perform the method.

29 Claims, 4 Drawing Sheets

(56) References Cited

U.S. PATENT DOCUMENTS

| | | | |
|---|---|---|---|
| 2005/0197080 A1* | 9/2005 | Ulupinar et al. | 455/135 |
| 2006/0125689 A1 | 6/2006 | Narayan et al. | |
| 2008/0144753 A1* | 6/2008 | Saed et al. | 375/347 |
| 2009/0027562 A1* | 1/2009 | Arroyo | 348/730 |
| 2009/0098914 A1* | 4/2009 | Martin-Cocher et al. | 455/572 |
| 2009/0257379 A1* | 10/2009 | Robinson et al. | 370/329 |
| 2010/0173600 A1* | 7/2010 | Izumi et al. | 455/272 |
| 2011/0039508 A1* | 2/2011 | Lindahl et al. | 455/230 |

FOREIGN PATENT DOCUMENTS

| | | |
|---|---|---|
| JP | 2007036795 A | 2/2007 |
| WO | 03027817 | 4/2003 |
| WO | 03088521 | 10/2003 |
| WO | 2005084379 | 9/2005 |
| WO | 2005084379 A2 | 9/2005 |

OTHER PUBLICATIONS

Extended European Search Report; EPA 10173172.7; dated Sep. 16, 2010.

Examiner's report mailed Apr. 22, 2013, in corresponding Canadian patent application No. 2,713,468.

Examiner's Report dated Apr. 22, 2013 for the corresponding Canadian Patent Application No. 2,713,468.

* cited by examiner

METHOD FOR CONTROLLING OF RECEIVE DIVERSITY IN AN ANTENNA SYSTEM

CROSS REFERENCE TO RELATED APPLICATIONS

This application claims the benefit of and priority to U.S. application No. 61/235,512 filed Aug. 20, 2009, the contents of which are herein incorporated by reference.

TECHNICAL FIELD

Example embodiments relate to antenna systems enabled for performing antenna diversity, and more particularly to such systems for use in mobile communication devices.

BACKGROUND

Receive diversity (RxD) generally includes the use of a number of different antennas positioned at different spatial locations to receive different versions of the same signal. For example, based on a given environment having obstructions, various paths, etc., a signal may be subject to path loss and fading. Receive diversity may be used to process such aspects of a received source signal using the differing antenna positions. In some instances, receive diversity provides enhanced forward link capacity, lower base station transmit power, lower frame error rate, and improved data integrity when compared to processing without receive diversity.

However, a tradeoff occurs when implementing receive diversity. To enable receive diversity in some mobile communication devices, at least two antennas need to be powered by a battery. This causes an increased drain on the mobile battery. Such a process may require more battery power as compared to powering a single antenna for receiving signals without performing receive diversity. For example, up to twice the battery power may be required in some instances.

It would be advantageous to address some of the above-noted difficulties.

DETAILED DESCRIPTION OF EXAMPLE EMBODIMENTS

Some example embodiments generally relate to dynamic control of an antenna system, for example to enable and disable performance of antenna diversity, such as receive diversity.

In accordance with an example embodiment, there is provided a method for controlling receive diversity of an antenna system of a computer device, the antenna system including two or more antenna elements. The method includes establishing a session with a remote transmitting system and determining whether a predetermined criteria detected by the computer device is satisfied within the session. If the predetermined criteria is satisfied within the session, the method includes activating at least two of the antenna elements for receiving transmissions, enabling performance of receive diversity on the received transmissions, and performing receive diversity on the received transmissions. If the predetermined criteria is not satisfied within the session, the method includes activating at least one of the antenna elements, disabling performance of receive diversity on the received transmissions, and performing a default signal processing on the received transmissions.

In accordance with another embodiment, there is provided a computer device for controlling of receive diversity. The computer device includes a controller for controlling operation of the computer device, an antenna system including two or more antenna elements and controllable by the controller, a power source for individually activating each of the antenna elements for receiving transmissions; and a signal processor for performing signal processing on the received transmissions including performing of a default signal processing and performing of receive diversity. The controller is configured for establishing a session with a remote transmitting system and determining whether a predetermined criteria is satisfied within the session, and if so: activating at least two of the antenna elements for receiving transmissions, enabling performance of receive diversity on the received transmissions, and performing receive diversity on the received transmissions, and if the predetermined criteria is not satisfied within the session: activating at least one of the antenna elements, disabling performance of receive diversity on the received transmissions, and performing a default signal processing on the received transmissions.

In accordance with yet another example embodiment, there is provided a method for controlling receive diversity of an antenna system of a computer device, the antenna system including two or more antenna elements, the antenna system being configured for operating in a high power mode of signal processing including activation of at least two of the antenna elements and a low power mode of signal processing including activation of at least one of the antenna elements, the antenna system being defaulted to the low power mode of signal processing. The method includes determining whether a predetermined criteria detected by the computer device is satisfied, wherein the predetermined criteria includes determining whether the computer device is connected to an external power supply, and if so: activating at least two of the antenna elements for receiving transmissions, and enabling performance of the high power mode of signal processing; and; and if the predetermined criteria is not satisfied: activating at least one of the antenna elements, and enabling performance of the low power mode of signal processing on the received transmissions.

In accordance with a further example embodiment, there is provided a computer program product including a computer readable medium storing instructions in the form of executable program code for causing the computer device to perform the described methods.

Some embodiments described herein generally relate to computer devices such as handheld portable electronic devices. Examples of handheld electronic devices include mobile communication devices such as pagers, cellular phones, Global Positioning System (GPS) navigation devices and other satellite navigation devices, smart phones, wireless organizers and personal digital assistants. Some embodiments may also be applied to notebook computers such as wireless-enabled notebook computers.

Figure 2:
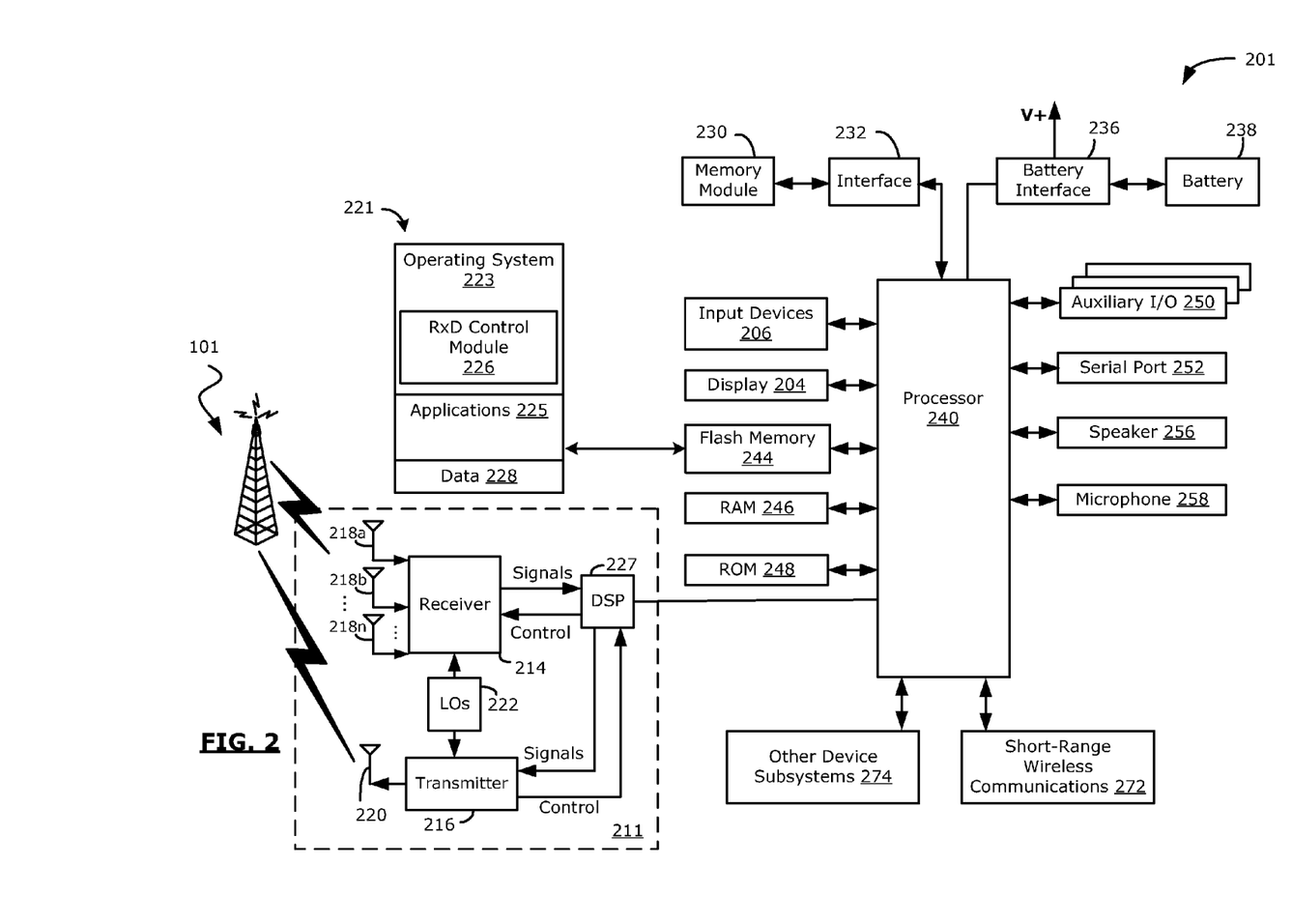
FIG. 2 shows a block diagram illustrating a mobile communication device in accordance with an example embodiment.

Reference is now made to FIG. 2 which illustrates a mobile communication device 201 in which example embodiments can be applied. The mobile communication device 201 is a two-way communication device having at least data and possibly also voice communication capabilities, and the capability to communicate with other computer systems, for example, via the Internet. Depending on the functionality provided by the mobile communication device 201, in various embodiments the device may be a data communication device, a multiple-mode communication device configured for both data and voice communication, a handheld mobile device such as a smartphone, mobile telephone or a PDA (personal digital assistant) enabled for wireless communication, or a computer system with a wireless modem.

The mobile communication device 201 includes a rigid case (not shown) housing the components of the device 201. The internal components of the device 201 are constructed on a printed circuit board (PCB). The mobile communication device 201 includes a controller including at least one processor 240 (such as a microprocessor) which controls the overall operation of the device 201. The processor 240 interacts with device subsystems such as a communication subsystem 211 for exchanging radio frequency signals with a wireless network 101 to perform communication functions. The processor 240 interacts with additional device subsystems including a display (screen) 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 272, and other device subsystems generally designated as 274. Some of the subsystems shown in FIG. 2 perform communication-related functions, whereas other subsystems may provide "resident" or on-device functions.

The device 201 may include a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The processor 240 operates under stored program control and executes software modules 221 stored in memory such as persistent memory, for example, in the flash memory 244. As illustrated in FIG. 2, the software modules 221 include operating system software 223 and software applications. An RxD control module 226 may, among other things, be implemented by the operating system 223 or through a stand-alone software application 225, or combined together in one or more of the operating system 223 and applications 225. In some example embodiments, the functions performed by the RxD control module 226 may be realized as a plurality of independent elements, rather than a single integrated element, and any one or more of these elements may be implemented as parts between the operating system 223 and other software applications 225.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may include a range of applications, including, for example, an address book application, a messaging application, a calendar application, and/or a notepad application. In some embodiments, the software applications 225 include an email message application, a push content viewing application, a voice communication (i.e. telephony) application, a map application, and a media player application. Each of the software applications 225 may include layout information defining the placement of particular fields and graphic elements (e.g. text fields, input fields, icons, etc.) in the user interface (i.e. the display screen 204) according to the application.

In some embodiments, the mobile communication device 201 also includes a removable memory card 230 (typically comprising flash memory) and a memory card interface 232. Network access typically associated with a subscriber or user of the mobile communication device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile communication device 201 in order to operate in conjunction with the wireless network 101.

The mobile communication device 201 stores data 228 in an erasable persistent memory, which in one example embodiment is the flash memory 244. In various embodiments, the data 228 includes service data comprising information required by the mobile communication device 201 to establish and maintain communication with the wireless network 101. The data 228 may also include user application data such as email messages, address book and contact information, calendar and schedule information, notepad documents, image files, and other commonly stored user information stored on the mobile communication device 201 by its user, and other data. The data 228 stored in the persistent memory (e.g. flash memory 244) of the mobile communication device 201 may be organized, at least partially, into a number of databases each containing data items of the same data type or associated with the same application. For example, email messages, contact records, and task items may be stored in individual databases within the device memory.

In some embodiments, the auxiliary input/output (I/O) subsystems 250 may comprise an external communication link or interface, for example, an Ethernet connection. The mobile communication device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a navigational tool such as a clickable trackball or thumbwheel, a digital camera, or a vibrator for providing vibratory notifications in response to various events on the device 201 such as receipt of an electronic communication or incoming phone call, or for other purposes such as haptic feedback (touch feedback).

The serial data port 252 may be used for synchronization with a user's host computer system (e.g., computer 117 (FIG. 1)). The serial data port 252 enables a user to set preferences through an external device or software application and extends the capabilities of the mobile communication device 201 by providing for information or software downloads to the mobile communication device 201 other than through the wireless network 101. The alternate download path may, for example, be used to load an encryption key onto the mobile communication device 201 through a direct, reliable and trusted connection to thereby provide secure device communication.

In some embodiments, the mobile communication device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system 117 using standard connectivity protocols. When a user connects their mobile communication device 201 to the host computer system 117 via a USB cable or Bluetooth® connection, traffic that was destined for the wireless network 101 is automatically routed to the mobile communication device 201 using the USB cable or Bluetooth® connection. Similarly, any traffic destined for the wireless network 101 is automatically sent over the USB cable Bluetooth® connection to the host computer system 117 for processing.

The short-range communication subsystem 272 is an additional optional component which provides for communication between the mobile communication device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 201 during or after manufacture. Additional applications and/or upgrades to the operating system 223 or software applications 225 may also be loaded onto the mobile communication device 201 through the wireless network 101, the auxiliary I/O subsystem 250, the serial port 252, the short-range communication subsystem 272, or other suitable subsystems 274 or wireless communication interfaces. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile communication device 201 and may provide enhanced on-device functions, communication-related functions, or both. For example, secure communication applications may enable electronic commerce functions and other such financial transactions to be performed using the mobile communication device 201.

The mobile communication device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 242. A user of the mobile communication device 201 may also compose data items, such as email messages, for example, using the input devices in conjunction with the display screen 204. These composed items may be transmitted through the communication subsystem 211 over the wireless network 101.

In the voice communication mode, the mobile communication device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile communication device 201. Although voice or audio signal output is typically accomplished primarily through the speaker 256, the display screen 204 may also be used to provide an indication of the identity of a calling party, duration of a voice call, or other voice call related information.

The mobile communication device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile communication device 201, and the battery interface 236 provides a mechanical and electrical connection for the battery 238. The battery interface 236 is coupled to a regulator (not shown) which provides power V+ to the circuitry of the mobile communication device 201. A battery level indicator (not shown) may also be included for detecting and indicating the remaining batter power.

In some conventional cellular phones, receive diversity is performed on the received signals during a voice call in dependence of signal quality or signal strength. Once the signal strength reaches below a certain level, receive diversity is activated and remains activated until the end of the voice call. However, such a system has limited applicability to voice calls, and if the signal once again returns to an acceptable level the receive diversity remains activated.

In some example embodiments, the mobile communication device 201 with the communication subsystem 211 is enabled to perform various aspects of antenna diversity, such as receive diversity. Generally, a source signal may be subject to path loss and fading based on a given environment having obstructions, various paths, etc. Receive diversity may be used to process such aspects of a received source signal based on the differing positions of antenna elements. In some instances, receive diversity provides enhanced signal processing when compared to processing without receive diversity. It would be appreciated by those skilled in the art that various implementations of receive diversity may be applied to those embodiments described herein.

Thus, the communication subsystem 211 may generally be used for enabling wireless communications to be received, and in some embodiments transmitted, by the mobile communication device 201. The communication subsystem 211 may for example be used by any of the various subsystems of the mobile communication device 201 which may require wireless communications. The communication subsystem 211 includes an antenna system including a receiver 214, a transmitter 216, and associated components, local oscillators (LOs) 222, and a processing module such as a digital signal processor (DSP) 227. The DSP 227 acts as a controller or local controller for the communication subsystem 211, and may be in communication with the RxD control module 226. The receiver 214 is associated with at least two antenna elements 218a, 218b, . . . , 218n (each or collectively referred to as 218), while the transmitter 216 is associated with antenna element 220 (one shown). As would be understood in the art, the antenna elements 218, 220 may be embedded or internal to the mobile communication device 201, and formed of at least some conductive material for receiving or transmitting (or both) of electromagnetic signals. Although antenna elements 218 and 220 are illustrated separately, in some example embodiments at least some of the antenna elements 218, 220 are shared by both receiver and transmitter, and enabled for both transmitting and receiving. As will be apparent to those skilled in the field of communication, the particular design of the wireless communication subsystem 211 depends on the wireless network 101 in which mobile communication device 201 is intended to operate.

Figure 1:
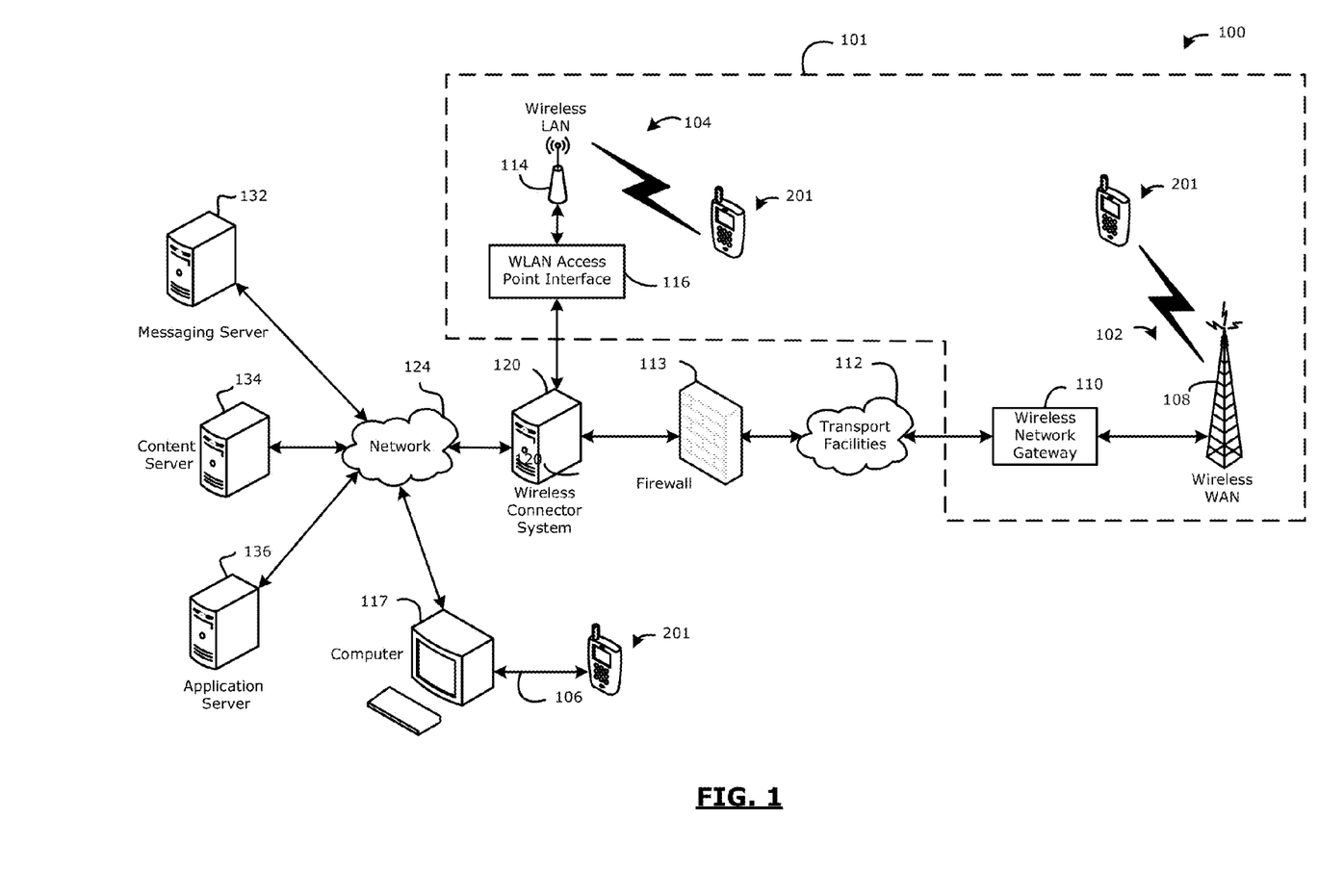
FIG. 1 shows a block diagram illustrating a communication system including a mobile communication device to which example embodiments can be applied.

The mobile communication device 201 may communicate with any one of a plurality of fixed transceiver base stations 108 (or, in some embodiments, fixed transmitter base stations) of the wireless network 101 within its geographic coverage area. The mobile communication device 201 may send and receive communication signals over the wireless network 101 after the required network registration or activation procedures have been completed. Signals received by the antenna elements 218 through the wireless network 101 are input to the receiver 214, which may perform such receiver functions as signal amplification, signal combining, frequency down conversion, filtering, channel selection, etc., as well as analog-to-digital (A/D) conversion, as would be understood in the art. A/D conversion of a received signal allows more complex communication functions such as demodulation and decoding to be performed in the DSP 227. In a similar manner, signals to be transmitted are processed, including modulation and encoding, for example, by the DSP 227. These DSP-processed signals are input to the transmitter 216 for digital-to-analog (D/A) conversion, frequency up conversion, filtering, amplification, and transmission to the wireless network 101 via the antenna 220. The DSP 227 not only processes communication signals, but may also provide for receiver and transmitter control. For example, the gains applied to communication signals in the receiver 214 and the transmitter 216 may be adaptively controlled through automatic gain control algorithms implemented in the DSP 227.

The receiver 214, through control by the DSP 227, may therefore be used to independently activate each antenna element 218a, 218b, . . . , 218n. Reference to activating for example includes having the battery 238 provide a power supply to the individual antenna element 218, typically by way of activating associated switches or amplifiers, or similar components. For example, in instances where at least two antenna elements 218 are to be activated, the receiver 214 may do so by powering those specific antenna elements 218 from the battery 238.

The DSP 227 may also be configured for various modes of signal processing on the received signal. In one aspect, the DSP 227 is enabled to perform receive diversity on the received signals (by activating two or more of the antenna elements 218). The DSP 227 may also perform a "default" signal processing without receive diversity, for example by activating only one antenna element 218. Thus, in some instances, the signal processing based on receive diversity may be referred to as a high power mode of operation while the signal processing without receive diversity may be referred to as a low power mode of operation. In another example mode, the DSP 227 is configured so that multiple antenna elements 218 may be activated without implementing receive diversity, wherein the signal processing is based merely on processing the received signals based on redundancy or the combined signal. The DSP 227 may also be configured to enable or disable various modes of operation, or switch between various modes, depending on the particular application as described in detail hereinbelow.

In example embodiments, the DSP 227 may also perform some aspects of the RxD control module 226, or vice versa. In the embodiment shown, the RxD control module 226 is in communication with the DSP 227 and may enable or disable performing of receive diversity by the DSP 227.

The specific position of each antenna element 218 may be located in dependence of on the specific configuration or application of the mobile communication device 201. For example, in order to implement various forms of receive diversity each antenna element 218 may be spaced apart at a distance for example to improve the received signal for performing receive diversity. In an example embodiment, the antenna elements 218 are spaced apart in dependence of the general wavelength range (or carrier wavelength) of the received transmissions. In another example embodiment, two of the antenna elements 218 are located on opposing sides or faces of the casing (not shown) of the mobile communication device 201. The remaining antenna elements 218, if any, may each also be located within the casing (not shown) at generally equal distances between the two of the said opposing antenna elements. Other antenna configurations are also possible in other embodiments.

Figure 3:
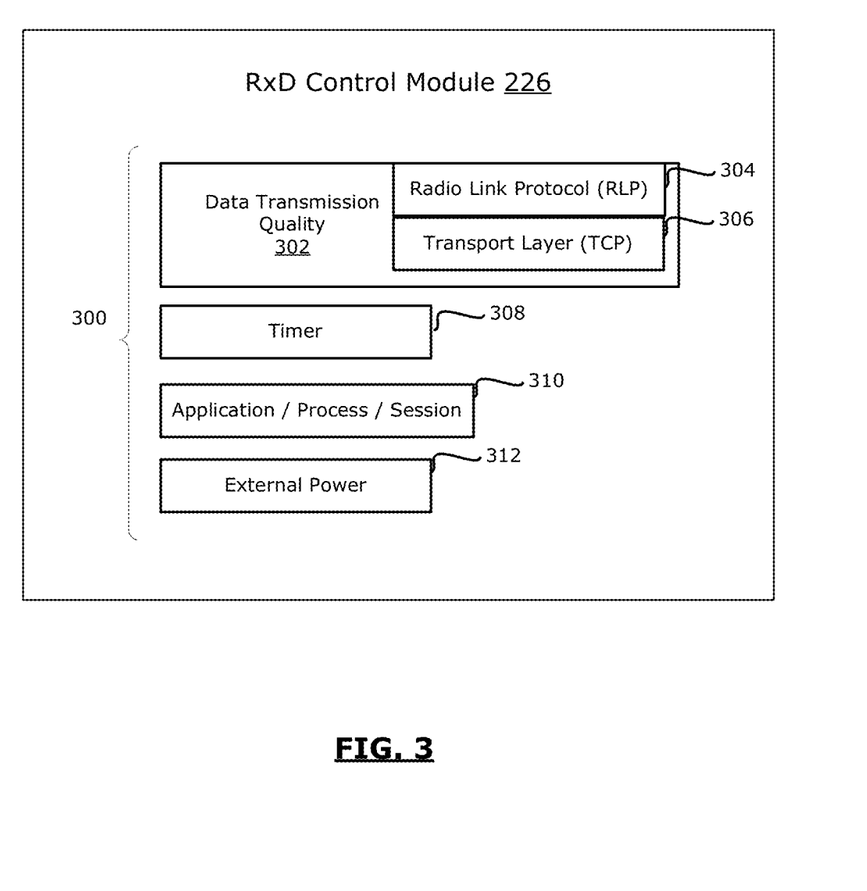
FIG. 3 shows a block diagram of a communication subsystem of the mobile communication device of FIG. 2 in accordance with one example embodiment.

Referring now to FIG. 3, the RxD control module 226 will now be described in greater detail. As shown, the RxD control module 226 may include various sub-modules 300, for example a data transmission quality sub-module 302, a timer sub-module 308, an application/process/session sub-module 310, and an external power sub-module 312. The RxD control module 226 may provide commands or instructions to enable the various modes of signal processing described above, for example to enable or disable receive diversity or to enable or disable "default" signal processing without receive diversity, or for switching between such modes (or other modes). At least some of the sub-modules 300 include a rule or a predetermined criteria stored within the data 228, and enabling of receive diversity if such criteria is satisfied. Other rules or criteria are also provided by some of the sub-modules 300. In some embodiments, the predetermined criteria is based on data operations of the computer device 201.

Referring briefly to FIG. 2, the communication subsystem 211 may be in communication with the wireless network 101 and configured for receiving of transmissions (generally of a source data signal) from the wireless network 101. For some applications or implementations, the communication subsystem 211 is used to facilitate sessions with the wireless network 101, for example data sessions. If the mobile communication device is implementing a voice application, the sessions may for example include a voice session. In other embodiments, a combination of both voice sessions and data sessions may be implemented, for example in some video-conferencing or conference call applications. Reference to sessions includes both continuous as well as asynchronous sessions, as appropriate. An asynchronous session could for example include Session Initiation Protocol (SIP)-based messaging. In example embodiments, the RxD control module 226 dynamically or automatically controls receive diversity by enabling as well as disabling receive diversity within a given session, depending on the detected conditions of the mobile communication device 201 or the wireless network 101 (which may change within a given session).

Referring to FIG. 3, the exemplary sub-modules 300 will now be described in greater detail. The data transmission quality sub-module 302 may for example detect data transmission quality of transmissions received and/or sent by the communication subsystem 211. In such an embodiment, the communication subsystem 211 initially operates under the "default" signal processing without receive diversity, for example by activating only one antenna element 218 (while de-activating the remaining antenna elements 218). For example, data packet loss may be used as a criteria, wherein receive diversity is enabled when a predetermined percentage of data packet loss is detected. The data transmission quality sub-module 302 may for example be implemented using a Radio Link Protocol (RLP) module 304 or a transport layer module 306. As is understood in the art, RLP is an automatic repeat request fragmentation protocol used over a wireless (typically cellular) air interface. An RLP detects packet losses and performs retransmissions to bring packet loss down to within a given threshold which may be suitable for some TCP/IP applications. RLP also implements stream fragmentation and reassembly, and sometimes, in-order delivery. The RLP module 304 is configured to track an amount of packet loss detected by RLP. For example, a user or administrator may set a predetermined threshold such a percentage of packet loss to be detected by the RLP module 304, or number of RLP retransmissions within a session or time period. If the percentage of packet loss exceeds the threshold, then instructions or commands are sent to the communication subsystem 211 to enable receive diversity. Depending on the desired complexity, these thresholds may be computed from the start of the session, or computed based within a specified time period. A user interface (not shown) on the display screen 204 may also be provided so that the specific threshold or time period may be adjusted or set by a user in real time within a given session (e.g., may be "tunable" using a sliding scale). In some example embodiments, if the percentage of packet loss returns to within the predetermined threshold with the same session, receive diversity becomes disabled and the communication subsystem 211 returns to the "default" signal processing without receive diversity.

The transport layer module 306 may for example include the use of Transmission Control Protocol (TCP). As is understood in the art, TCP operates in the transport layer and includes mechanisms for accommodating errors or losses in transmitted data packets. For example, TCP detects these errors, requests retransmission of lost packets, rearranges out-of-order packets, and may even assist in minimizing network congestion to reduce the occurrence of other problems. Once the TCP receiver has reassembled the data packet as originally transmitted, it passes that data packet to the appropriate application 225. The transport layer module 306 determines whether the retransmissions or checksum failures of TCP (as would be understood in the art) exceed a predetermined threshold (e.g., by percentage of number of occurrences within a session). If so, receive diversity is activated in the communication subsystem 211. In some example embodiments, if the retransmissions or checksum failures returns to within the predetermined threshold with the same session, receive diversity becomes disabled and the communication subsystem 211 returns to the "default" signal processing without receive diversity. Once again, this threshold may be "tunable" by using a user interface or other mechanism.

It can be appreciated that some aspects of the data transmission quality sub-module 302 are already being implemented by the specific RLP or TCP process. Thus, in some embodiments, the data transmission quality sub-module 302 reuses and takes advantage of computational processes which are already taking place within the mobile communication device 201.

The application/process/session sub-module 310 may be used in dependence of operating wither a specific application 225 or process implemented by the operating system 223 or session type. For example, the application/process/session sub-module 310 may maintain a list of specific applications, processes, or session types for example stored in data 228 (FIG. 2). Upon activation or execution of a particular application or process, the application/process/session sub-module 310 determines whether the application, process, or session is included within the list, and if so enables receive diversity. The criteria for inclusion in the list may for example be those applications, processes, or sessions which depend on relatively long or resource-intensive sessions or calls. For example, a teleconference or video streaming application may be included in the list. In another embodiment, the list may be dynamically or automatically generated by the application/process/session sub-module 310. For example, when any application, process, or session is being implemented, the application/process/session sub-module 310 determines or tracks the amount of data being transmitted. If, for a specified application, process or session, the amount of data being transmitted is found to be consistently relatively high, that application, process or session may be included in the list. In another embodiment, the average amount of data being transmitted is tracked and stored for a specified application, process or session. If the average amount of data being transmitted is found to be relatively high, that application, process or session may be included in the list. Similar procedures may be used for removing an application, process or session from the list.

The timer sub-module 308 is dependent on the duration of, for example, a session, an application, a process, etc. The communication subsystem 211 initially operates under the "default" signal processing without receive diversity, for example by activating only one antenna element 218. A timer is initiated based on a predetermined trigger such as the beginning of the session, the execution of an application, process, or session, etc. A predetermined time period is determined. For example, the predetermined time period may be based on a duration wherein it could be presumed that considerable data traffic is being passed for the session. After the predetermined time period has elapsed and the session is still determined to be active, then receive diversity is enabled. Thus, receive diversity may be used to increase the amount of data transmitted when necessary. In some embodiments, the value of the predetermined time period is selected based on typical traffic session durations. For example, for short "data burst" activity, the predetermined time period is of a suitable time to avoid enabling receive diversity for short data sessions or calls. The predetermined time period may also be selected based on the wireless access technology hosting the data call; for example, a slower technology like 1x/CDMA may have a longer timer value than a faster technology such as 1x-EVDO. For an always-on application with intermittent short data burst activity, such as email passing, this sub-module 308 may avoid the frequent use of receive diversity when in relatively stable data link quality coverage.

The external power sub-module 312 includes enabling of receive diversity when the mobile communication device 201 is connected to an external power source, such as through serial data port 252 (e.g., USB). The serial power 252 may also be used for data communication and recharging of the battery 238. When external power is drawn through the serial data port 252, receive diversity is enabled as power conservation of the battery 238 may no longer be desired. In another embodiment, when the battery 238 or device 201 is connected to or being recharged using any other power source such as an external power supply (e.g. AC charger, etc.), received diversity is enabled.

In some embodiments, the RxD control module 226 may activate receive diversity depending on any given sub-module 300, or in a combination or weighting of specified sub-modules 300. Depending on the desired level of restriction, any or all of the sub-modules 300 (and associated criteria) may be utilized in combination to achieve the level of control, balanced with the level of complexity. For example, the data transmission quality sub-module 302 may have a relatively higher computational requirement than the timer sub-module 308, but may offer a higher degree of accuracy). If the data call is active long enough, then the timer sub-module 308 will enable receive diversity; however, if any of the data transmission quality sub-module 302 is satisfied before the timer expires, then receive diversity will be enabled sooner. In another example embodiment, each of the sub-modules 300 may also operate independently to control (enable and disable) receive diversity. Suitable algorithms may be used to resolve any conflicts, however, in one embodiment any conflicts are resolved in favour of enabling receive diversity.

Figure 4:
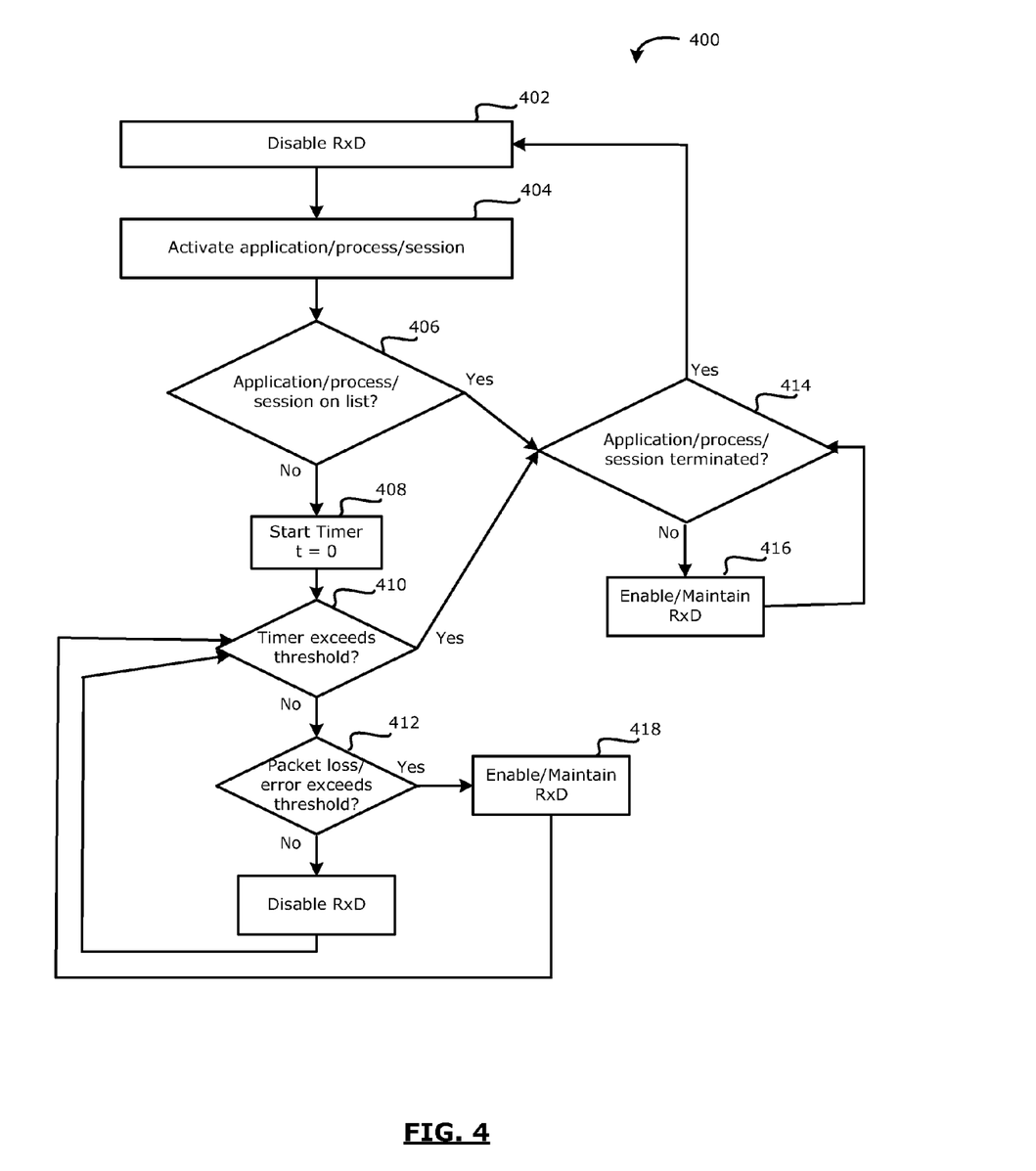
FIG. 4 shows a flowchart illustrating example operations for controlling receive diversity of the mobile communication device of FIG. 2 in accordance with an example embodiment.

Referring now to FIG. 4, a method for controlling of receive diversity in the communication subsystem 211 in accordance with an embodiment will be described. FIG. 4 illustrates example operations 400 for performing the method. In this example embodiment, the operations 400 are carried out by the RxD control module 226 with the DSP 227. The operations 400 may for example be implemented with respect to a specific session, application or process. In some embodiments, the operations 400 may be implemented each time a specific session, application or process is initiated, and wherein multiple versions of the operations 400 run in parallel (e.g., one for each active session, application or process). However, it can further be appreciated that in some embodiments various aspects of the operations 400 may be performed independently of any specific session, application or process.

At process 402, the operations 400 typically have a default or normal operating state by disabling receive diversity, and for example performing "default" signal processing without receive diversity. For example, only one antenna element 218 may be activated in order to conserve power consumption of the battery 238. At process 404, a specific application, process or session is initiated. At process 406, it is determined whether the specific application, process or session is on a list of specified applications, processes or sessions (the list may be generated, stored and retrieved from data 228, as described above with respect to the application/process/session sub-module 310). If so, the operations 400 proceed to process 414. At process 414, it is determined whether the application, process or session is no longer active and is terminated. If the application, process or session is active and running (if "no"), receive diversity is enabled at process 416 (or maintained, if already enabled). If the application, process or session is no longer active and is terminated (if "yes"), the operations 400 proceed to process 402, once again disabling receive diversity (operating under "default" signal processing without receive diversity).

Referring again to process 406, if the application, process or session is not on the predetermined list (if "no"), the operations 400 proceed to process 408, which initializes or resets a timer to zero. At process 410, it is determined whether the timer exceeds a predetermined time duration threshold (the choice of which is described in detail above with respect to the timer sub-module 308). If the timer has exceeded the predetermined threshold (if "yes"), the operations 400 proceed to process 414, described above.

Still referring to process 410, if the timer is still within a predetermined threshold (if "no"), the operations 400 proceed to process 412, wherein it is determined whether the percentage of packet loss exceeds a predetermined threshold (or whether data quality falls below a predetermined threshold). This may for example be implemented by the data quality sub-module 402, described above. If the percentage of packet loss exceeds the threshold (if "yes"), the operations 400 proceed to process 418 to enable receive diversity (or maintain receive diversity if already enabled). Still referring to process 412, there may also be dynamic control to also disable receive diversity within a given application, process or session. Thus, if the percentage of packet loss is within the threshold (if "no"), disable receive diversity (or maintain as disabled if already disabled). The operations may then proceed to process 410 to once again determine whether the timer exceeds a threshold.

In some example embodiments, still referring to process 410, to prevent unnecessary toggling, a hysteresis timer (not shown) or merely a timer may be used with respect to a particular criteria. For example, if the data quality is continually considered to be below the threshold (i.e., "bad" data quality) within another predetermined time period (not shown, but typically less than the timer threshold in process 410), the hysteresis timer therefore expires and receive diversity is enabled, and vice versa. Prior to expiration of the hysteresis timer, receive diversity is maintained as disabled (i.e., refrained from being enabled). The hysteresis timer may be weighted or dynamically determined to account for various conditions based on recent activity, such as on the difference of data quality from the threshold, or the amount of time that has passed since the last toggling. If the difference of data quality from the threshold is larger, the hysteresis timer may be shorter (and vice versa). If the amount of time that has passed since the last toggling is larger, the hysteresis timer may be shorter (and vice versa). Combinations or sub-combinations of these factors or other factors may be used to generate the hysteresis timer.

While the operations 400 have been described as occurring in a particular order for exemplary purposes, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. For example, in some embodiments process 418 transitions directly to decision process 414, rather than checking the timer (process 410).

Variations of the mobile communication device 201 are possible. For example, in some example embodiments, the transmitter 216 may be controlled by the DSP 227 to perform transmit diversity on the antenna elements 220 (at least two antenna elements 220 would be required in this embodiment rather than the only one shown, or may for example share at least some of the same antenna elements 218 of the receiver 214). The mobile communication device 201 may be configured to enable or disable transmit diversity, depending on the particular application, which may be performed independent or in conjunction with the receive diversity performed by the DSP 227. For example, the transmit diversity may be enabled and disabled based on the same criteria as for receive diversity, for example based on certain data operations of the mobile communication device 201.

In order to facilitate an understanding of one possible environment in which example embodiments described herein can operate, reference is made to FIG. 1 which shows in block diagram form a communication system 100 in which example embodiments of the present disclosure can be applied. The communication system 100 comprises a number of mobile communication devices 201 which may be connected to the remainder of system 100 in any of several different ways. Accordingly, several instances of mobile communication devices 201 are depicted in FIG. 1 employing different example ways of connecting to system 100. Mobile communication devices 201 are connected to the wireless network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 201 may be implemented as any suitable wireless access network technology. By way of example, but not limitation, the WWAN 201 may be implemented as a wireless network that includes a number of transceiver base stations 108 (one of which is shown in FIG. 1) where each of the base stations 108 provides wireless Radio Frequency (RF) coverage to a corresponding area or cell. The WWAN 201 is typically operated by a mobile network service provider that provides subscription packages to users of the mobile communication devices 201. In some embodiments, the WWAN 201 conforms to one or more of the following wireless network types: Mobitex Radio Network™, DataTAC™, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"™), or various other networks. Although WWAN 201 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 201 may further comprise a wireless network gateway 110 which connects the mobile communication devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the Internet rather than an internal or enterprise network.

The wireless network gateway 110 provides an interface between the wireless connector system 120 and the WWAN 201, which facilitates communication between the mobile communication devices 201 and other devices (not shown) connected, directly or indirectly, to the WWAN 102201. Accordingly, communications sent via the mobile communication devices 201 are transported via the WWAN 201 and the wireless network gateway 110 through transport facilities 112 to the wireless connector system 120. Communications sent from the wireless connector system 120 are received by the wireless network gateway 110 and transported via the WWAN 201 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11 g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 comprises a wireless network which, in some embodiments, conforms to IEEE 802.11x standards (sometimes referred to as Wi-Fi) such as, for example, the IEEE 802.11a, 802.11b and/or 802.11 g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly as indicated by the dashed line if FIG. 1 via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email server), and a content server 134 for providing content such as Internet content or content from an organization's internal servers, and application servers 136 for implementing server-based applications such as instant messaging (IM) applications to mobile communication devices 201.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 201, and can typically be regenerated by the user on mobile communication devices 201. Data sent to the mobile communication devices 201 is encrypted by the wireless connector system 120 using the private encryption key retrieved from the user's mailbox. The encrypted data, when received on the mobile communication devices 201, is decrypted using the private encryption key stored in memory. Similarly, data sent to the wireless connector system 120 from the mobile communication devices 201 is encrypted using the private encryption key stored in the memory of the mobile communication device 201. The encrypted data, when received on the wireless connector system 120, is decrypted using the private encryption key retrieved from the user's mailbox.

The wireless network gateway 110 is adapted to send data packets received from the mobile communication device 201 over the WWAN 201 to the wireless connector system 120. The wireless connector system 120 then sends the data packets to the appropriate connection point such as the messaging server 132, content server 134 or application servers 136. Conversely, the wireless connector system 120 sends data packets received, for example, from the messaging server 132, content server 134 or application servers 136 to the wireless network gateway 110 which then transmit the data packets to the destination mobile communication device 201. The AP interfaces 116 of the WLAN 104 provide similar sending functions between the mobile communication device 201, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination.

The mobile communication device 201 may alternatively connect to the wireless connector system 120 using a computer 117, such as desktop or notebook computer, via the network 124. A link 106 or data connection may be provided for exchanging information (including synchronization data) between the mobile communication device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings herein may be employed in connection with any other type of network and associated devices that are effective in implementing or facilitating wireless communication. Suitable variations of the communication system will be understood to a person of skill in the art and are intended to fall within the intended scope.

For example, the above-noted system may be described as a single-input and multiple-output (SIMO) as between the mobile communication device 201 and the wireless network 101, as would be understood in the art. Other example embodiments may for example be applied to multiple-input and multiple-output (MIMO) systems, as would be understood in the art, for example the received source signal being generated from a transmitting system having multiple transmitters at differing positions.

While some aspects have been described in terms of methods, a person of ordinary skill in the art will understand that the those aspects are also directed to various apparatus such as a handheld electronic device including components for performing at least some of the aspects and features of the described methods, be it by way of hardware components, software or any combination of the two, or in any other manner. Similarly, aspects described as mobile communication devices may apply to associated methods for performing the same aspects. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of present embodiments.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method for controlling receive diversity of an antenna system of a computer device, the antenna system including two or more antenna elements, the method comprising:
    establishing a session with a remote transmitting system;
    determining whether a predetermined criteria detected by the computer device is satisfied within the session, and if so: activating at least two of the antenna elements for receiving transmissions, enabling performance of receive diversity on the received transmissions, and performing receive diversity on the received transmissions;
    if the predetermined criteria is not satisfied within the session: activating at least one of the antenna elements, disabling performance of receive diversity on the received transmissions, and performing a default signal processing on the received transmissions; and
    displaying an interface on the computer device, the interface including a user tuneable element for setting of a threshold during the session, wherein the predetermined criteria includes the threshold,
    wherein the predetermined criteria is detected over a time period, the time period having a length which is user controllable through the interface using a sliding scale.

2. A method as claimed in claim 1, wherein said session includes a data session or a voice session.

3. A method as claimed in claim 1, wherein the predetermined criteria includes determining whether the computer device is connected to an external power supply.

4. A method as claimed in claim 1, wherein the antenna elements are activateable by a portable power source having a limited power supply.

5. A method as claimed in claim 4, wherein the portable power source is rechargeable by way of a data connection, wherein the predetermined criteria includes the computer device being connected to the data connection.

6. A method as claimed in claim 1, wherein the predetermined criteria is based on data communications of the computer device.

7. A method as claimed in claim 6, wherein the predetermined criteria is further based on data quality of the data communications.

8. A method as claimed in claim 1, further comprising activating a timer and refraining from enabling or disabling of performance of receive diversity within the timer.

9. A method as claimed in claim 8, wherein the timer is dependent on a difference between a detected value in relation to the threshold.

10. A method as claimed in claim 8, wherein the timer is dependent on a time of most recent enabling or disabling of performance of receive diversity.

11. A method as claimed in claim 10, wherein the predetermined criteria includes determining whether a time of the session has exceeded a predetermined time period.

12. A method as claimed in claim 1, wherein the interface includes a sliding scale for setting of the threshold.

13. A computer device for controlling of receive diversity, comprising:
    a controller for controlling operation of the computer device;
    an antenna system including two or more antenna elements and controllable by the controller;
    a power source for individually activating each of the antenna elements for receiving transmissions; and
    a signal processor for performing signal processing on the received transmissions including performing of a default signal processing and performing of receive diversity,
    the controller being configured for establishing a session with a remote transmitting system and determining whether a predetermined criteria is satisfied within the session, and if so: activating at least two of the antenna elements for receiving transmissions, enabling performance of receive diversity on the received transmissions, and performing receive diversity on the received transmissions,
    if the predetermined criteria is not satisfied within the session: activating at least one of the antenna elements, disabling performance of receive diversity on the received transmissions, and performing a default signal processing on the received transmissions, and
    displaying an interface on the computer device, the interface including a user tuneable element for setting of a threshold during the session, wherein the predetermined criteria includes the threshold,
    wherein the predetermined criteria is detected over a time period, the time period having a length which is user controllable through the interface using a sliding scale.

14. A computer device as claimed in claim 13, wherein said session includes a data session or a voice session.

15. A computer device as claimed in claim 13, wherein the predetermined criteria includes determining whether the computer device is connected to an external power supply.

16. A computer device as claimed in claim 13, wherein the power source includes a portable power source having a limited power supply.

17. A computer device as claimed in claim 16, further comprising a data connection for recharging the portable power source, wherein the predetermined criteria includes the computer device being connected to the data connection.

18. A computer device as claimed in claim 13, wherein the predetermined criteria is based on data communications of the computer device.

19. A computer device as claimed in claim 18, wherein the predetermined criteria is further based on data quality of the data communications.

20. A computer device as claimed in claim 13, wherein the controller is further configured for activating a timer and refraining from enabling or disabling performance of receive diversity within the timer.

21. A computer device as claimed in claim 20, wherein the timer is dependent on a difference between a detected value in relation to the threshold.

22. A computer device as claimed in claim 20, wherein the timer is dependent on a time of most recent enabling or disabling of performance of receive diversity.

23. A computer device as claimed in claim 13, wherein the predetermined criteria includes determining whether a time of the session has exceeded a predetermined time period.

24. A computer device as claimed in claim 13, wherein the computer device is a portable mobile communication device.

25. A computer device as claimed in claim 13, wherein the interface includes a sliding scale for setting of the threshold.

26. A method for controlling receive diversity of an antenna system of a computer device, the antenna system including two or more antenna elements, the antenna system being configured for operating in a high power mode of signal processing including activation of at least two of the antenna elements and a low power mode of signal processing including activation of at least one of the antenna elements, the antenna system being defaulted to the low power mode of signal processing, the method comprising:
- determining whether a predetermined criteria detected by the computer device is satisfied, wherein the predetermined criteria includes determining whether the computer device is connected to an external power supply, and if so: activating at least two of the antenna elements for receiving transmissions, and enabling performance of the high power mode of signal processing;
- if the predetermined criteria is not satisfied: activating at least one of the antenna elements, and enabling performance of the low power mode of signal processing on the received transmissions; and
- displaying an interface on the computer device, the interface including a user tuneable element for setting of a threshold during a session with a remote transmitting system, wherein the predetermined criteria includes the threshold,
- wherein the predetermined criteria is detected over a time period, the time period having a length which is user controllable through the interface using a sliding scale.

27. A method as claimed in claim 26, wherein the antenna elements are activateable by a portable power source having a limited power supply.

28. A method as claimed in claim 27, wherein the portable power source is rechargeable by way of a data connection, wherein the predetermined criteria includes the computer device being connected to the data connection.

29. A method as claimed in claim 26, wherein the interface includes a sliding scale for setting of the threshold.

* * * * *